Jan. 14, 1936. W. E. LARKIN 2,027,388
SCOOTER
Filed Sept. 19, 1933 2 Sheets-Sheet 1
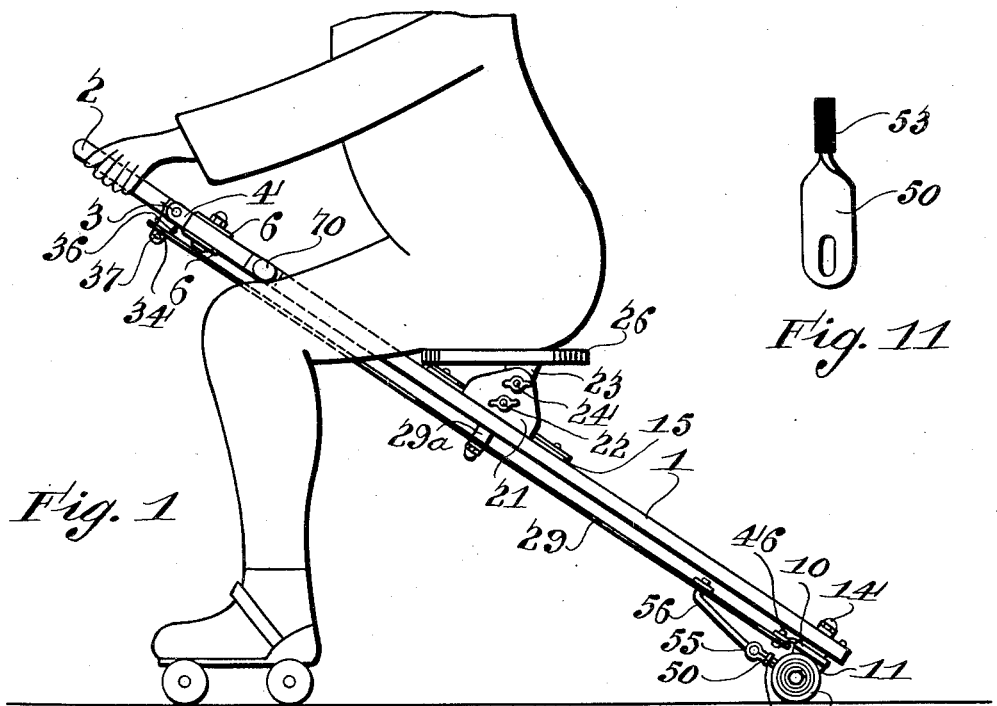
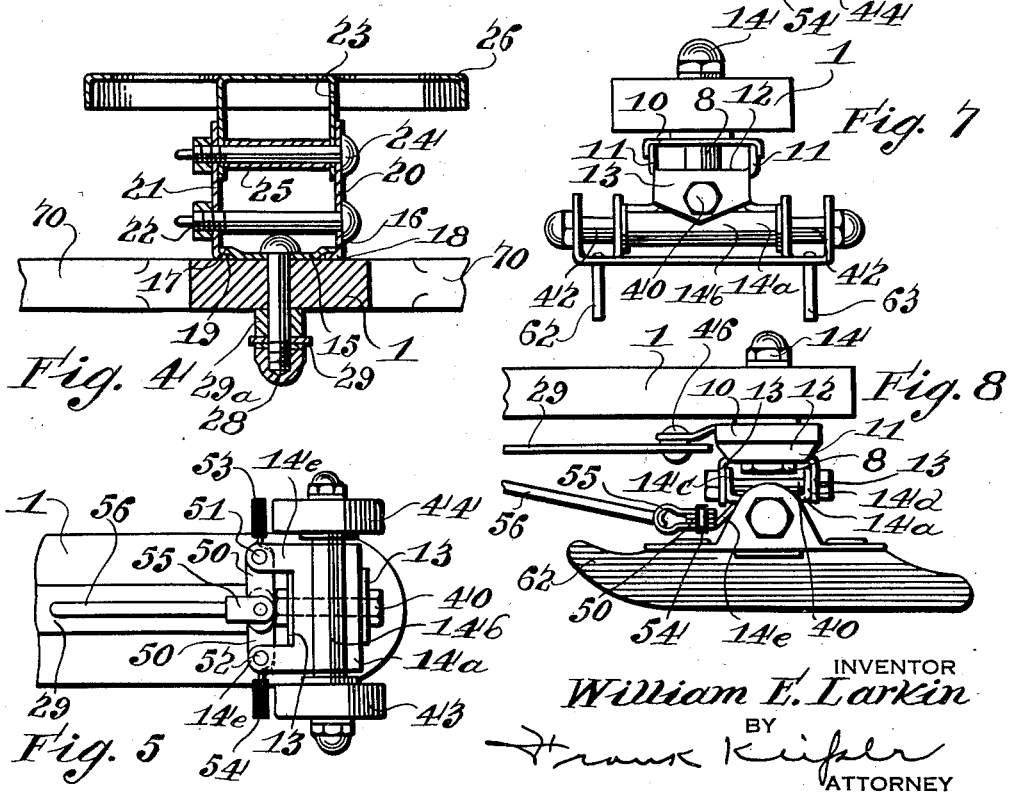
INVENTOR
William E. Larkin
BY
Frank Kiefer
ATTORNEY Jan. 14, 1936.  W. E. LARKIN  2,027,388
SCOOTER
Filed Sept. 19, 1933  2 Sheets-Sheet 2
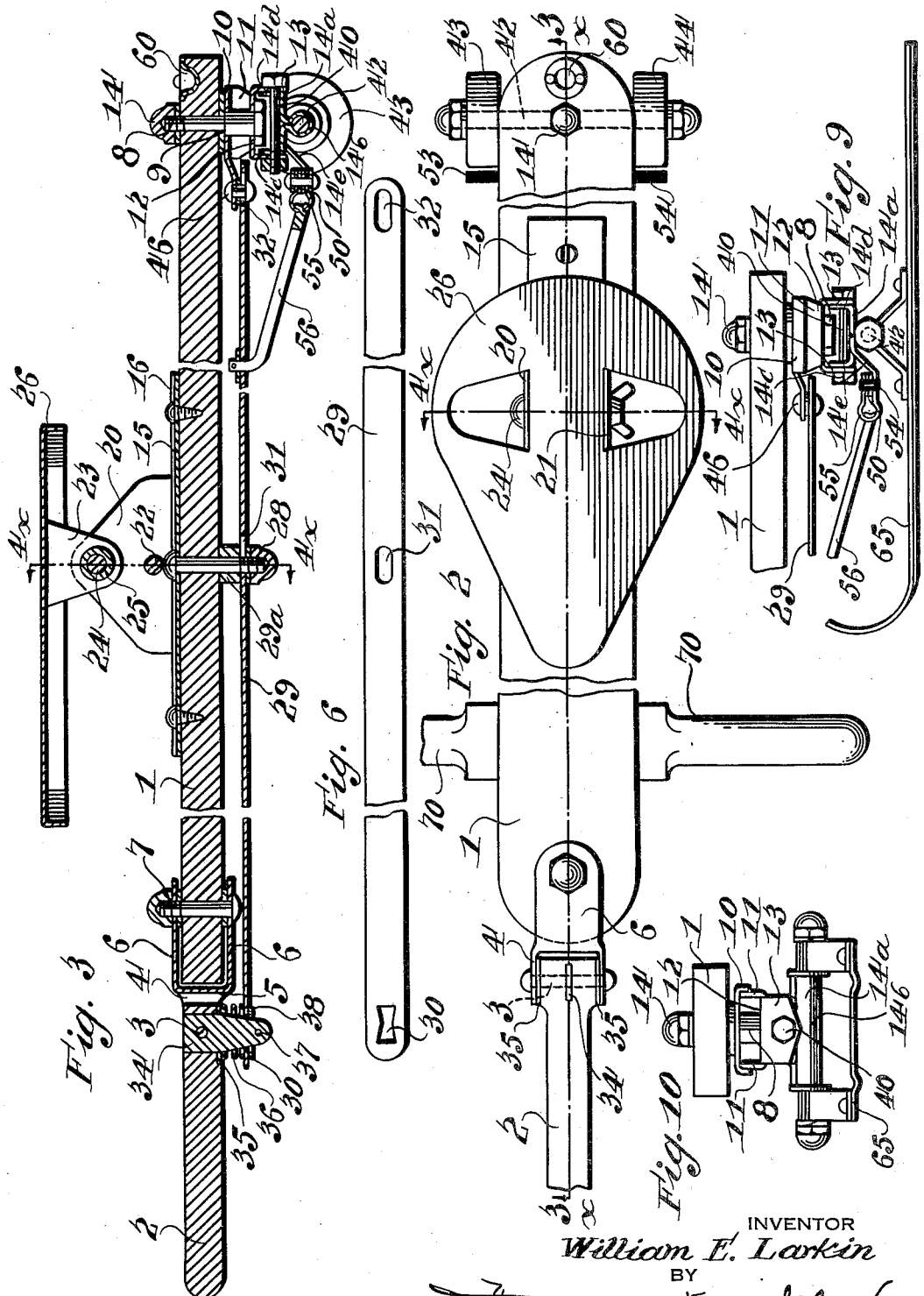
INVENTOR
William E. Larkin
BY
Frank Kuiper
ATTORNEY Patented Jan. 14, 1936

2,027,388

UNITED STATES PATENT OFFICE 2,027,388

SCOOTER

William E. Larkin, Flushing, N. Y.

Application September 19, 1933, Serial No. 690,113

14 Claims. (Cl. 208—182)

The object of this invention is to provide a scooter that can be used by a person that is experienced in the use of roller skates, ice skates, and skis.

Another object of the invention is to provide a scooter on which a seat is provided in which the rider can sit while the scooter itself is held at an angle of 40 degrees or thereabouts to the horizontal.

Another object of the invention is to provide a scooter that can be steered, and to which a brake can be applied.

Another object of the invention is to provide a scooter that has but one pair of wheels, located at the rear, the wheels at the front being provided by the roller skates on the feet of the rider.

Another object of the invention is to make a scooter that is convertible in that the rollers may be replaced with double runner ice skates, and skis.

These and other objects of the invention will be illustrated in the drawings, described in the specification, and pointed out in the claims at the end thereof.

In the drawings:

Figure 1 is a side elevation of the scooter in service.

Figure 2 is a top plan view of the scooter partly broken away.

Figure 3 is a vertical section on the line 3x—3x of Figure 2.

Figure 4 is a vertical section on the line 4x—4x of Figures 2 and 3.

Figure 5 is a bottom plan view of the lower right hand corner of Figure 3.

Figure 6 is a detail view, partly broken away, of the steering and brake rod.

Figure 7 is a rear elevation of the scooter, viewed from the right of Figure 3, showing a double runner ice skate substituted for the wheels.

Figure 8 is a side elevation of the rear end of the scooter equipped with skates, as shown in Figure 7.

Figure 9 is a side elevation of the rear end of the scooter equipped with skis.

Figure 10 is a rear elevation of the scooter equipped with skis, as shown in Figure 9.

Figure 11 is a detail view of one of the brake beams.

In the drawings like reference numerals indicate like parts.

In the drawings reference numeral 1 indicates the chassis, which is preferably made of wood, and which for all practical purposes is about three feet long. On the forward end of the chassis is doubly pivoted the steering and brake handle 2. This handle is mounted to swing on a vertical axis 3, which has a bearing on the yoke 4. This yoke has two members standing normally in a vertical plane and projecting forward from an upright central member 5, and has two members 6, 6 projecting rearwardly from the member 5, which members normally stand in the horizontal position. These members engage both sides of the chassis 1 and are pivoted thereon by the bolt 7.

At the rear end of the chassis is pivotally mounted a small two wheel truck that is built up in the following manner. The chassis is perforated with a vertical hole to receive a bolt 8. This bolt has two diameters and a shoulder 9. This bolt passes through a plate 10 which is supported from two flanges 11 turned up from a plate 12. On the intermediate sides of the plate 12 two flanges 13 are turned down. The plate 10 is welded to the flanges 11. The bolt 8 passes through both the plates 10 and 12 and the hexagon head of the bolt rests on the under side of and supports the plate 12. The upper end of the bolt 8 is threaded, and the bolt is held in place by a cap nut 14. Washers are interposed between the cap nut 14 and the chassis, and between the plate 10 and the chassis 1. The shoulder 9 is drawn against the washer under the chassis by the cap nut. The plate 10 has a tongue which extends forwardly therefrom and is bent down and forward and engages with the steering rod 29, which is provided with an elongated slot, to which it is fastened with a sliding pivot by a rivet 46 that will be hereinafter further referred to.

The pivoted truck also includes a plate 14a which has a tubular bearing 14b bent integral therewith on the lower side thereof, which is adapted to receive the shaft or spindle 42 that carries the wheels 43 and 44 of the truck. This plate also has the forward and back edges thereof bent up into flanges 14c and 14d, which fit snugly between the flanges 13 bent down from the plate 12. These flanges are perforated to receive a bolt 40, by which the assembly is held together, and on which the plate 12 and the parts supported thereby can tip somewhat on the plate 14a which permits the chassis to swing over sideways when the scooter is going around a curve. The whole truck swings on the vertical bolt 8 when the scooter is being steered, as will be hereinafter described. On each side of the plate 14 tongues 14e project downwardly and forward, which tongues are used to support the brake beams that will presently be described.

On top of the chassis, at a point intermediate thereof, is provided a plate 15 having the edges offset upwardly as indicated at 16 and 17. Under these upwardly offset edges engage the flanges 18 and 19 of the upright brackets 20 and 21. These brackets are held together by the tie-bolt 22, and at the top is pivotally mounted between them the inverted U-shaped bracket 23, the sides of which are perforated. The uprights 20 and 21 are also perforated and a bolt 24 passes through the perforations of these members, so that the bracket 23 is pivotally supported on the uprights 20 and 21. The upright members are spaced apart by the collar or sleeve 25 provided on the shank of the bolt 24.

On the U-shaped bracket 23 is attached the seat 26. This seat, with the members that support it, can slide back and forth on the chassis, being held thereon by the engagement above described with the plate 15. It is obvious that the seat can rock on the bolt 24 to any desired position, being preferably held in the position shown in Figure 1.

Through the center of the plate 15 and the chassis 1 passes the bolt 28. On the lower end of this bolt the brake and steering rod 29 is mounted to slide and swing, being spaced from the chassis by the block 29a. This rod is provided with elongated slots therein, as indicated at 30, 31 and 32. At the forward end, this rod 29 is connected to a tongue 34 that is carried in a slot in the handle 2 and projects downwardly therefrom. The handle is reinforced on the bottom and two sides by a U-shaped strap 35, which serves as a reinforce to hold the tongue in place. The bolt 3 passes through this strap 35 and through the tongue 34 and serves as a pivot and also to hold the parts together. A helical spring 36 is provided between the bottom of the handle and the forward end of the steering and brake rod, by which lost motion is taken up and the parts are held properly in place.

The tongue 34 passes through the slot 30 and is fastened therein by a cotter pin 37, a washer 38 being interposed between the cotter pin and the steering and brake rod. The slot 30 is narrow or choked in the middle and is expanded at both ends, so as to provide a good bearing at the center and permit the swinging of the handle from one side to the other without binding.

On the tongue projecting forward from the plate 10 is provided a rivet 46, which extends through the elongated slot 32 at the rear end of the steering and brake rod. As the handle 2 is turned to the left, it turns the forward end of the brake rod 29 to the left, and turns the rear end of it to the right, causing the truck and the wheels to swing so as to carry the rear end of the chassis to the right. When the handle 2 is turned to the right, it will in like manner cause the steering and brake rod 29 to cause the wheels to swing in the opposite direction and carry the rear end of the chassis to the left. In this way the steering of the scooter is provided for by moving the handle 2 either to the right or to the left.

I provide two brake beams 50 on the scooter that are adapted to engage the wheels 43 and 44. These brake beams are pivoted at 51 and 52 on the tongues 14e. These beams on the outer ends carry the brake shoes shown at 53 and 54. The inner ends of the two brake beams overlap each other and are connected to a yoke 55, which, in turn, is connected to a rod 56, which engages with the brake rod 29 and is moved forward and back therewith. The outer ends of the brake beams are given a quarter turn and carry the shoes that engage the wheels. The raising of the handle 2 draws the brake rod forward, and draws the brake shoes against the wheels. The lowering of the handle 2 pushes the brake rod back and draws the brake shoes away from the wheels.

The inner ends of the brake beams overlap each other and have slots therein through which a pivot pin engages, which pin is carried by the yoke 55, so that the yoke 55 and the rod 56 are pivotally connected with the ends of the brake beams. Because of this, the swinging of the steering and brake rod 29 sideways has no effect on the brake beams, which are moved only by the forward and back movement of the rod 29. The forward and back movement of the rod 29 has no effect on the turning of the wheels for the purpose of steering.

On the rear end of the chassis I provide a socket 60, which can be engaged by a stick or a rod, and by which it can be pushed from behind.

In Figure 8 I have shown the runners 62 and 63 of a skate which are substituted for the wheels, being pivotally mounted on the shaft 42.

In Figure 9 I have shown a ski 65 pivotally mounted on the shaft 42, instead of the wheels.

In operation, the rider wears a pair of roller skates, and sits on the seat 26, and holds the chassis in the position shown in Figure 1, and in this position he can coast along, using the roller skates and his knees to support the forward end of the chassis. For this purpose the chassis is provided with a cross bar 70, which, when used as shown in Figure 1, rests on the knees of the rider and holds the chassis at the proper angle from the ground. The steering and braking is done by swinging the handle 2 to the right or left, or by raising or lowering it as above described.

When the rollers are replaced with skates or skis, the rider will wear skates or skis on his feet instead of roller skates.

I claim:

1. In a scooter, the combination of a chassis, a pair of wheels supporting the rear end of the chassis, a handle at the front end of the chassis mounted to be turned to the right and left, and connections between said handle and said wheels by which the wheels may be turned for the purpose of steering.

2. In a scooter, the combination of a chassis, a pair of wheels supporting the rear end of the chassis, a handle at the front end of the chassis mounted to be turned up and down or to the right and left, connections between said handle and said wheels by which the wheels may be turned for the purpose of steering, brakes adapted to be applied to said wheels, and connections between said handle and the brakes by which the brakes may be set against the wheels and released therefrom on the up and down movement of the handle.

3. In a scooter, the combination of a chassis, a pair of wheels supporting the rear end of the chassis, a handle in the form of a bell crank pivoted at the front end of the chassis and extending forwardly therefrom and mounted to be turned up and town, brakes adapted to be applied to said wheels, and connections between said handle and the brakes by which the brakes may be set against the wheels and released therefrom on the up and down movement of the handle.

4. In a scooter, the combination of a chassis, a pair of wheels supporting the rear end of the chassis, a handle mounted at the front end of the chassis to swing on two pivots at right angles to each other, a yoke pivotally mounted on the chassis and adapted to swing to the right or left with the handle, said handle being pivotally mounted on the yoke and adapted to swing up and down, a brake and steering rod having a slot therein pivotally mounted under the middle of the chassis and adapted to swing sideways at each end and slide forward and back on the pivot, and a tongue rigidly fastened to the handle and swinging on the pivotal mounting of the handle with the handle, said tongue engaging the forward end of the brake and steering rod and being adapted to cause it to move forward or back, or to the right or left, corresponding to the movement of the handle.

5. In a scooter, the combination of a chassis, a truck having two wheels supporting the rear end of the chassis, said truck having a plate having a bearing formed therein, a shaft mounted in said bearing on which said wheels are supported, said plate having upwardly turned flanges on the front and rear edges thereof, a second plate above the first plate, said second plate having flanges turned down on the front and rear edges thereof embracing the outside of the flanges turned up on the first named plate, said flanges being perforated, a bolt carried horizontally in said flanges on which the lower plate and wheels can swing sideways and tongues extending forward and down from the first named plate.

6. In a scooter, the combination of a chassis, a truck having two wheels supporting the rear end of the chassis, said truck having a plate having a bearing formed therein, a shaft mounted in said bearing on which said wheels are supported, said plate having upwardly turned flanges on the front and rear edges thereof, a second plate above the first plate, said second plate having flanges turned down on the front and rear edges thereof embracing the outside of the flanges turned up on the first named plate, said flanges being perforated, a bolt carried horizontally in said flanges on which the lower plate and wheels can swing sideways, flanges turned up on the sides of the second plate, a third plate fastened on said flanges, said second and third plates having perforations, and a bolt passing up through said second and third plates and having its head under the second plate, said bolt passing up through the chassis and forming a vertical pivot on which said truck can turn.

7. In a scooter, the combination of a chassis, a truck having two wheels supporting the rear end of the chassis, said truck having a plate having a bearing formed therein, a shaft mounted in said bearing on which said wheels are supported, said plate having upwardly turned flanges on the front and rear edges thereof, a second plate above the first plate, said second plate having flanges turned down on the front and rear edges thereof embracing the outside of the flanges turned up on the first named plate, said flanges being perforated, a bolt carried horizontally in said flanges on which the lower plate and wheels can swing sideways, flanges turned up on the sides of the second plate, a third plate fastened on said flanges, said second and third plates having perforations, a bolt passing up through said second and third plates and having its head under the second plate, said bolt passing up through the chassis and forming a vertical pivot on which said truck can turn, and a tongue extending forward from the third plate by which the truck can be turned to the right or left on its vertical pivot.

8. In a scooter, the combination of a chassis, a truck having two wheels supporting the rear end of the chassis, said truck having a plate having a bearing formed therein, a shaft mounted in said bearing on which said wheels are supported, said plate having upwardly turned flanges on the front and rear edges thereof, a second plate above the first plate, said second plate having flanges turned down on the front and rear edges thereof embracing the outside of the flanges turned up on the first named plate, said flanges being perforated, a bolt carried horizontally in said flanges on which the lower plate and wheels can swing sideways, flanges turned up on the sides of the second plate, a third plate fastened on said flanges, said second and third plates having perforations, a bolt passing up through said second and third plates and having its head under the second plate, said bolt passing up through the chassis and forming a vertical pivot on which said truck can turn, a tongue extending forward from the third plate by which the truck can be turned to the right or left on its vertical pivot, and a steering rod pivoted on a vertical pivot under the chassis and connected at its rear end to said tongue.

9. In a scooter, the combination of a chassis, a bracket pivotally mounted at the forward end of the chassis on a vertical axis, said bracket being adapted to swing to the right or left, and a handle pivoted in said bracket forward of the chassis on a horizontal axis and being adapted to swing up and down independent of the bracket and to swing to the right and left with the bracket.

10. In a scooter, the combination of a chassis, a bracket pivotally mounted at the forward end of the chassis on a vertical axis, said bracket being adapted to swing to the right or left, a handle pivoted in said bracket forward of the chassis on a horizontal axis and being adapted to swing up and down independent of the bracket and to swing to the right and left with the bracket, and a tongue mounted rigidly in said handle and projecting downwardly therefrom.

11. In a scooter, the combination of a chassis, a bracket pivotally mounted at the forward end of the chassis on a vertical axis, said bracket being adapted to swing to the right or left, a handle pivoted in said bracket forward of the chassis on a horizontal axis and being adapted to swing up and down independent of the bracket and to swing to the right and left with the bracket, a tongue mounted rigidly in said handle and projecting downwardly therefrom, and a steering rod mounted to slide and swing centrally under said chassis, said rod being connected at its forward end to said tongue and being moved forward and back or swung sideways by the movement of said handle.

12. In a scooter, the combination of a chassis, a bracket pivotally mounted at the forward end of the chassis on a vertical axis, said bracket being adapted to swing to the right or left, a handle pivoted in said bracket forward of the chassis on a horizontal axis and being adapted to swing up and down independent of the bracket and to swing to the right and left with the bracket, a tongue mounted rigidly in said handle and projecting downwardly therefrom, a brake and steering rod mounted to slide and swing centrally under said chassis, said rod being connected at its forward end to said tongue and being moved forward and back or swung sideways by the movement of said handle, and a truck pivotally mounted on a vertical axis under the rear of said chassis, said truck having a tongue extending forward of its axis and having a pivoted and sliding engagement with said steering rod.

13. In a scooter, the combination of a chassis, a bracket pivotally mounted at the forward end of the chassis on a vertical axis, said bracket being adapted to swing to the right or left, a handle pivoted in said bracket forward of the chassis on a horizontal axis and being adapted to swing up and down independent of the bracket and to swing to the right and left with the bracket, a tongue mounted rigidly in said handle and projecting downwardly therefrom, a brake and steering rod mounted to slide and swing centrally under said chassis, said rod being connected at its forward end to said tongue and being moved forward and back or swung sideways by the movement of said handle, a truck pivotally mounted on a vertical axis under the rear of said chassis, said truck having a tongue extending forward of its axis and having a pivoted and sliding engagement with said steering rod, brake beams pivotally mounted on said truck and extending transversely of the truck, the inner ends of said brake beams overlapping each other, and means connecting the inner ends of said brake beams with the brake rod by which the brake beams are moved by the forward and back movement of the brake rod.

14. In a scooter, the combination of a chassis, a plate placed thereon, said plate having its side edges offset upwardly, upright brackets having flanges on the lower edges thereof adapted to engage under the upwardly offset edges of the plate, an inverted U-shaped member having its parallel sides upright and engaged between said upright brackets, bolts for fastening all of said upright members together, and a seat supported from said inverted U-shaped member.

WILLIAM E. LARKIN.